United States Patent [19]
Nickoladze et al.

[11] Patent Number: 6,072,303
[45] Date of Patent: Jun. 6, 2000

[54] METHOD AND APPARATUS FOR COMPENSATING A LINE SYNCHRONOUS GENERATOR

[76] Inventors: Leo G. Nickoladze, deceased, late of Kailua, Hi.; by Hildegard K. Marks, 1155 Kahili St., Kailua, Hi. 96734

[21] Appl. No.: 09/338,002

[22] Filed: Jun. 22, 1999

Related U.S. Application Data

[63] Continuation of application No. PCT/US98/02651, Feb. 6, 1998.
[60] Provisional application No. 60/037,723, Feb. 7, 1997.

[51] Int. Cl.⁷ ......................................................... H02P 9/44
[52] U.S. Cl. ................................................. 322/20; 322/32
[58] Field of Search .................................. 322/20, 28, 32, 322/58, 59; 310/162, 179

[56] References Cited

U.S. PATENT DOCUMENTS

| | | | |
|---|---|---|---|
| 2,829,333 | 4/1958 | Turvey | 322/32 |
| 2,854,617 | 9/1958 | Johnson | 322/32 |
| 4,019,104 | 4/1977 | Parker | 318/195 |
| 4,074,160 | 2/1978 | Broadway | 310/184 |
| 4,229,689 | 10/1980 | Nickoladze | 322/32 |
| 4,305,001 | 12/1981 | Vamaraju et al. | 290/5 |
| 4,472,673 | 9/1984 | Miller | 322/32 |
| 4,625,160 | 11/1986 | Hucker | 322/32 |
| 4,701,691 | 10/1987 | Nickoladze | 322/32 |
| 5,254,894 | 10/1993 | Satake et al. | 310/114 |
| 5,274,291 | 12/1993 | Clarke | 310/112 |
| 5,418,446 | 5/1995 | Hallidy | 322/28 |
| 5,525,894 | 6/1996 | Heller | 322/20 |
| 5,587,643 | 12/1996 | Heller | 318/821 |

OTHER PUBLICATIONS

International Search Report, Dated Jul. 30, 1998.

*Primary Examiner*—Nicholas Ponomarenko
*Attorney, Agent, or Firm*—Christie, Parker & Hale, LLP

[57] ABSTRACT

A line synchronous generator with an exciter and generator stage. The exciter stage includes an exciter stator and an exciter rotor, and the generator stage includes a generator stator and generator rotor. In one embodiment, the stators are wound with primary windings for connection to an AC power source and the rotors are wound with secondary windings. In an alternative embodiment, the rotors are wound with primary windings for connection to the AC power source and the stators are wound with secondary windings. The proper phase angle alignment of the secondary windings are determined by connecting the primary windings of the exciter and generator stages to the AC power source, and connecting the a secondary winding of the exciter stage to a secondary winding of the generator stage. The remaining open secondary leads are then tested for two pairs having a voltage equal to two times the line voltage, and two pairs having a voltage equal to √3 times the line voltage. The two pairs of open secondary leads having a voltage equal to two times the line voltage are connected together.

10 Claims, 12 Drawing Sheets

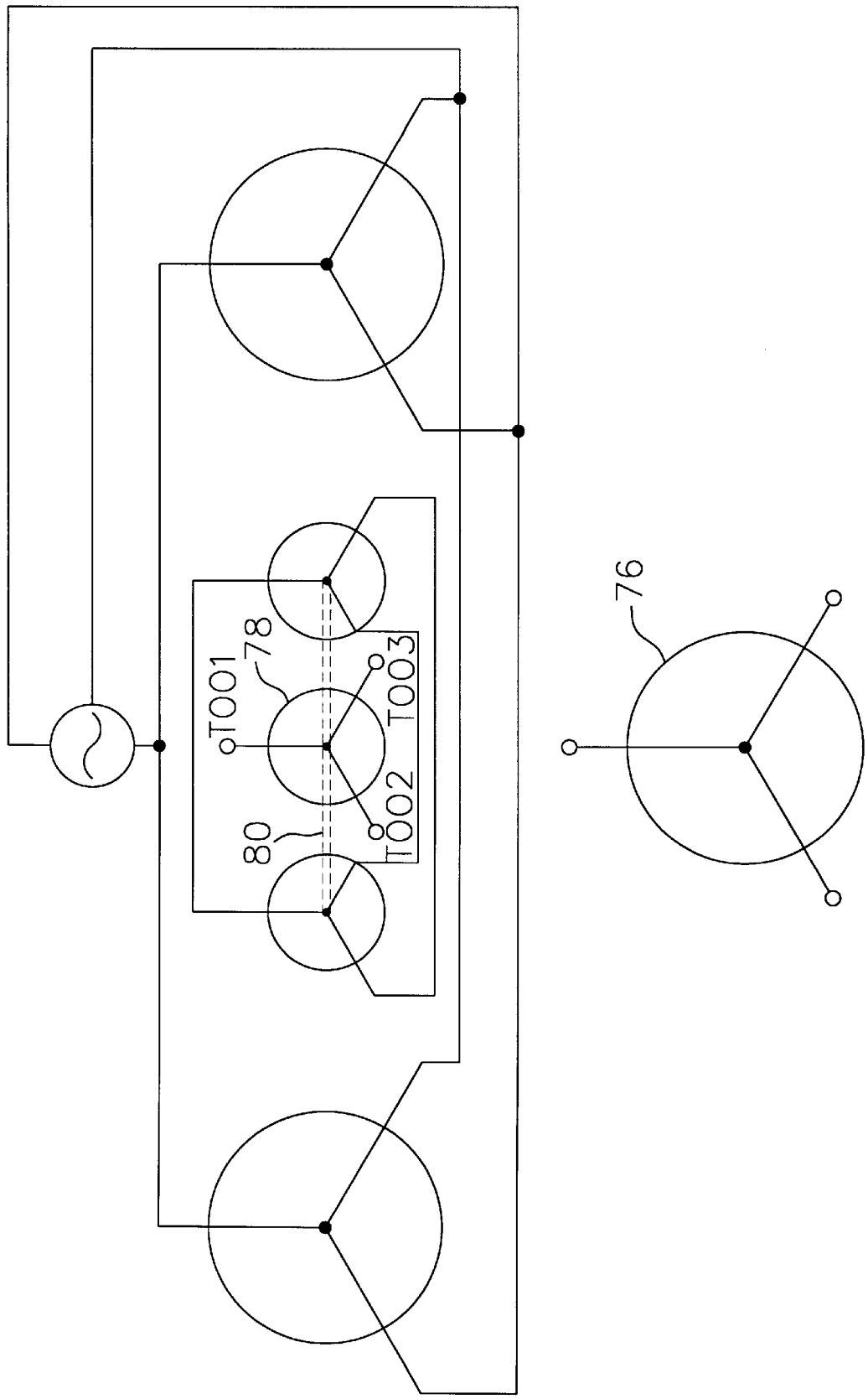

6,072,303

METHOD AND APPARATUS FOR COMPENSATING A LINE SYNCHRONOUS GENERATOR

CROSS-REFERENCE TO RELATED APPLICATIONS

This application is a continuation of co-pending PCT application, application No. PCT/US98/02651, filed Feb. 6, 1998, priority of which is hereby claimed under 35 U.S.C. § 120. The PCT application, application No. PCT/US98/02651, as well as this application, claims priority under 35 U.S.C. §119(e) to provisional application, application No. 60/037,723, filed Feb. 7, 1997. All of these applications are expressly incorporated herein by reference as though fully set forth.

FIELD OF THE INVENTION

The present invention relates generally to an electrical generator, and more particularly, to an improved induction generator referenced to an AC power source.

BACKGROUND OF THE INVENTION

Recently, brought on by the shortage in fossil fuel and the ecological consequences of such use, various proposals have been devised for inserting locally generated electrical power into a public utility grid. An assortment of renewable fuel sources have been investigated. The ideal alternative energy fuel source will not have an adverse impact on the ecology and will result in a high grade fuel at a low cost. Common examples of alternative energy fuel sources are wind, hydro, hydrocarbon gas recovery, solar, geothermal and waste heat recovery. Each of these fuel sources may be teamed with electrical power generators.

The difficulty in utilizing these fuel sources lies in the quality of the fuel itself. For example, variations in wind velocity severely limit the usefulness of wind power machines as a steady and constant fuel source for a conventional synchronous or induction generator. This is because conventional generators can deliver usable power only when they operate within a particular speed range. As a result, the wind power machines must employ doubly wound AC generators, or elaborate propeller pitch control and mechanical drive systems that provide appropriate generator speed. To be of practical use, however, doubly-fed systems must provide appropriate rotor excitation and maintain constant stator voltage, which is not easily accomplished. Where high speed geothermal turbines or low speed water wheels are employed, mechanical speed control, reduction, or step-up devices must be used to provide the appropriate rotational speed for AC generation. The efficiency losses which accompany these types of mechanical conversion devices compromise their economic viability and render them generally unsuitable as sources of power.

The compensation provided by these mechanical conversion systems are essential, however, because the insertion of locally generated electrical power into a public utility grid requires exact phase and frequency matching. Accordingly, if a device could be self-synchronizing and tolerant of widely varying rotational speed, the use of alternative fuel sources as a means for generating electricity would be greatly enhanced. One noteworthy example of such a self-synchronizing rotating device can be found in several patents issued to Leo Nickoladze, specifically in U.S. Pat. Nos. 4,701,691 and 4,229,689 which are expressly incorporated herein by reference as though fully set forth.

These latter examples rely on electrical cancellation within the inductive device itself whereby all variations in input power are effectively taken out. An exemplary embodiment of such induction device is shown in FIG. 1. The induction generator of FIG. 1 includes two stages, an exciter stage 10 and a generator stage 12. The exciter stage 10 includes an exciter stator 14 connected to an AC power source 16 and an exciter rotor 18 disposed for rotary advancement by a local power source 19. The generator stage 12 includes a generator rotor 20, connected for common rotation with the exciter rotor 18, and a generator stator 22. The windings of the exciter rotor 18 and the generator rotor 20 are connected together, but wound in opposite directions. The generator stator 22 is connected to a load 23.

In operation, the exciter rotor 18 is rotated by the local power source 19 within the rotating magnetic field developed by the exciter stator 14. The induced signal frequency at the output of the exciter rotor 18 is equal to the summation of the angular rate of the local power source 19 plus the frequency of the AC power source 16. As the generator rotor 20 is rotated within the generator stator 22, the inverse connection to the exciter rotor 14 causes the angular rate produced by the local power source 19 to be subtracted out. The result being an induced voltage at the output of the generating stator 22 equal in rate to the frequency of the AC power source.

While the foregoing Nickoladze solution provides a theoretical output voltage where only the line frequency of the utility grid is produced, in practice, the manufacture of these devices is often fraught with difficulty for three-phase power applications due proper phase angle alignment between the exciter and generator stages and the windings. Often, due to the physical windings of the rotor and stator elements, phase angle alignment between the exciter and generator stages could not be achieved in the past. Moreover, some devices simply failed to perform altogether because the phase sequence of the windings was improper. These problems become even more pronounced when the exciter stage and generator stage are manufactured independently of one another.

Accordingly, there is a current need for a three-phase line synchronous generator that can be produced with proper phase angle alignment for three-phase power applications resulting in a constant frequency and voltage output at variable shaft speeds. It is desirable that phase angle alignment be easily achieved even for exciter and generator components wound in opposite directions or with phases that start in different slots on the core with relation to the keyway.

SUMMARY OF THE INVENTION

An embodiment of the present invention is directed to a method and apparatus that satisfies this need. There is, therefore provided, according to a preferred embodiment, a line synchronous generator having an exciter stage with an exciter stator and an exciter rotor, and a generator stage with a generator stator and generator rotor. In one embodiment, the stators are wound with primary windings for connection to an AC power source and the rotors are wound with secondary windings. In an alternative embodiment, the rotors are wound with primary windings for connection to the AC power source and the stators are wound with secondary windings.

The proper phase angle alignment of the first, second and third phase windings of the secondary windings are determined by connecting the primary windings of the exciter and generator stages to the AC power source having a line voltage Vm, and connecting the first secondary phase winding of the exciter stage to the first secondary phase winding of the generator stage. Then, the voltage between the second secondary phase winding of the exciter stage and the second secondary phase winding of the generator stage is confirmed to be approximately 2 Vm, and the voltage between the third secondary phase winding of the exciter stage and the third secondary phase winding of the generator stage is confirmed to be approximately 2 Vm. Preferably, the voltage between the second secondary phase winding of the exciter stage and the third secondary phase winding of the generator stage is confirmed to be approximately a √3 Vm, and the voltage between the third secondary phase winding of the exciter stage and the second secondary phase winding of the generator stage is confirmed to be approximately √3 Vm. Once these voltages are confirmed, the second secondary phase winding of the exciter stage is connected to the second secondary phase winding of the generator stage, and the third secondary phase winding of the exciter stage is connected to the third secondary phase winding of the generator stage.

In a preferred embodiment of a rotor primary machine, the line synchronous generator is configured with an exciter rotor disposed for rotary advancement by an external power source. The exciter rotor includes a pair of poles each having a winding for connecting across the AC power source. The exciter stator, mounted for rotation on an interior portion of the exciter stator, also has a pair of poles each having a winding. The generator rotor, mounted for common rotation with the exciter rotor, has a pair of poles each having a winding for connection across the AC power source. The generator stator has an interior portion with the generator rotor rotationally mounted therein. The generator stator has a pair of poles each having a winding inversely connected to the corresponding windings on the exciter pole pair for canceling the electrical frequency induced by the of the rotation of the exciter and generator rotors.

An attractive feature of the described embodiments is that the line synchronous generator remains self-synchronizing despite variations in shaft speeds. Moreover, proper phase angle alignment can be readily achieved even for exciter and generator components independently manufactured with windings in opposite directions or with phases that start in different slots on the core with relation to the keyway. This economically viable solution to alternative power sources has a major potential for resolving the present energy shortage with minimum adverse ecological consequences.

It is understood that other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

These and other features, aspects, and advantages of the present invention will become better understood with regard to the following description, appended claims, and accompanying drawings where:

FIG. 4 is a simplified diagrammatic illustration of a redundant line synchronous generator structure in accordance with a preferred embodiment of the present invention;

DETAILED DESCRIPTION

Figure 1:
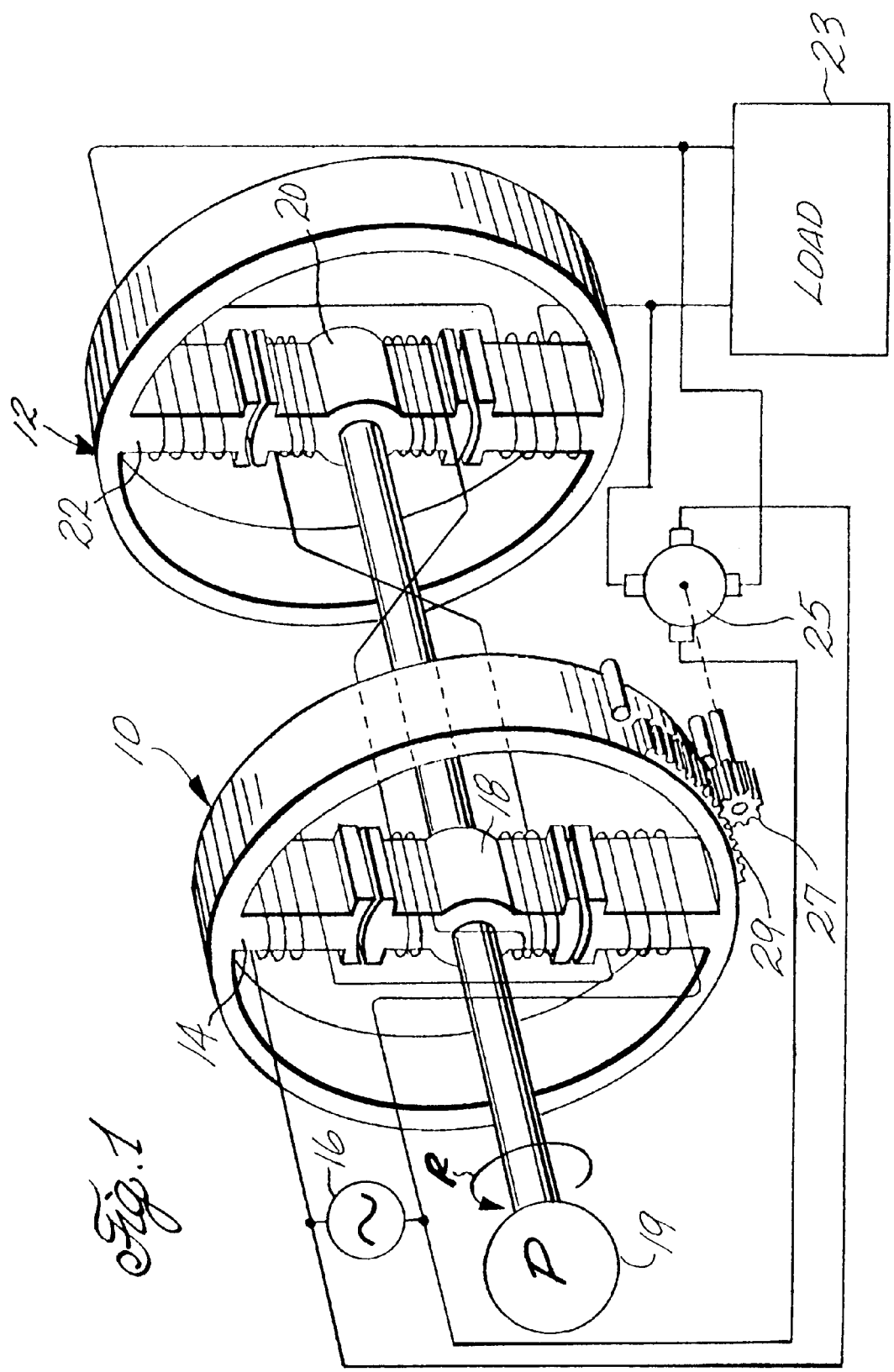
FIG. 1 is a simplified diagrammatic illustration of an induction generator described in U.S. Pat. Nos. 4,701,691 and 4,229,689.
Figure 2:
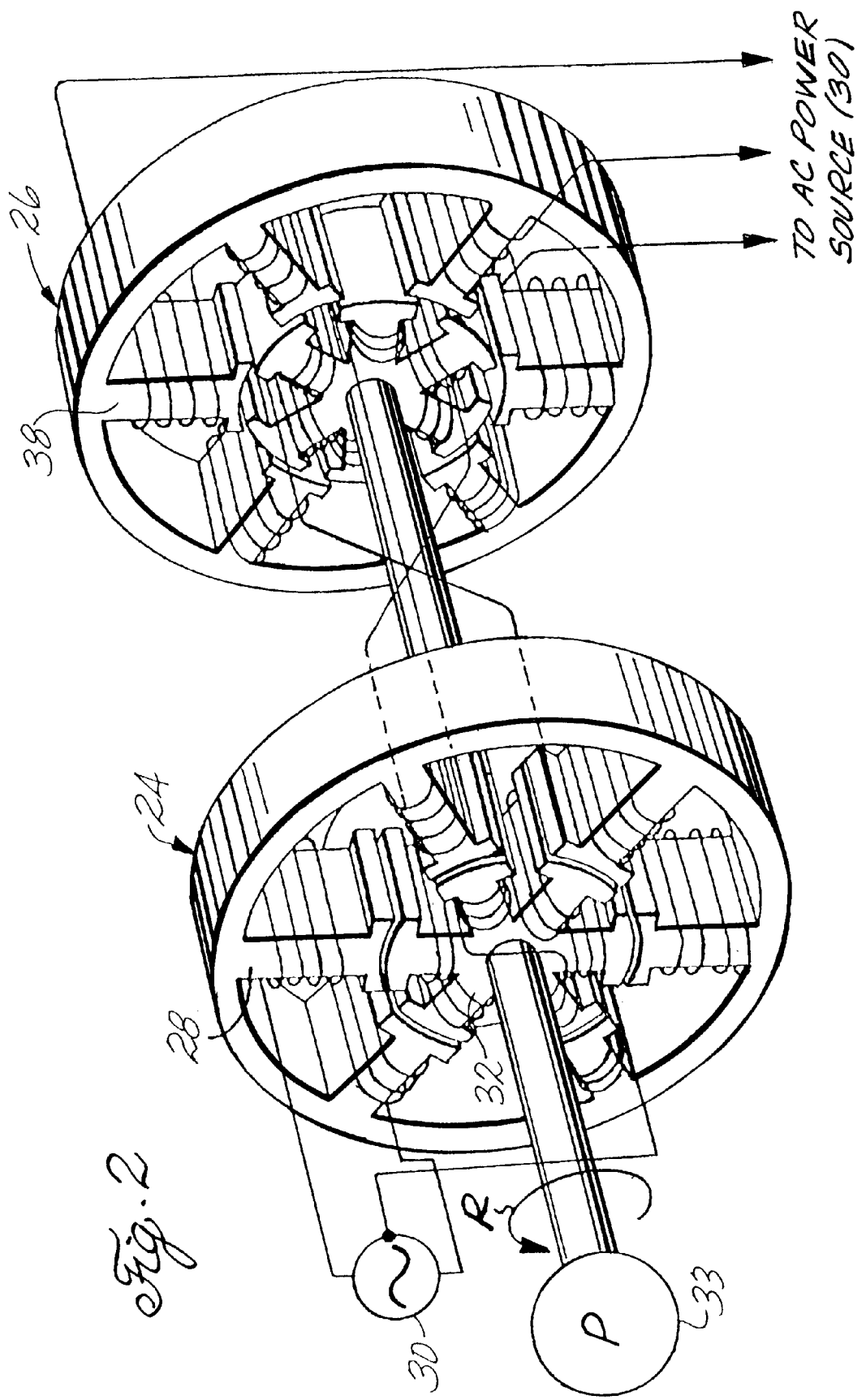
FIG. 2 is a simplified diagrammatic illustration of a three-phase stator primary line synchronous generator in accordance with a preferred embodiment of the present invention.

A preferred embodiment of the present invention is shown in FIG. 2. The three-phase line synchronous generator includes two stages, an exciter stage 24 and a generator stage 26. The exciter stage 24 includes an exciter stator 28 having three electromagnetic pole pairs. Each pole pair has a primary winding connected across a different phase of an AC power source 30. An exciter rotor 32, mounted for rotation within the interior of the exciter stator 28, also includes three electromagnetic pole pairs each wound with a secondary winding. The exciter rotor 32 is disposed for rotary advancement by a local power source 33.

The generator stage 26 includes a generator rotor 34 connected for common rotation with the exciter rotor 32 inside the interior of a generator stator 38. The generator rotor 34 also includes three electromagnetic pole pairs each wound with a secondary winding. The secondary windings of the generator rotor are inversely connected to the secondary windings of the exciter rotor 32 to effect electrical cancellation of the frequency induced by the angular rotation of the local power source. The generator stator 38 is connected to the AC power source 30.

Figure 3:
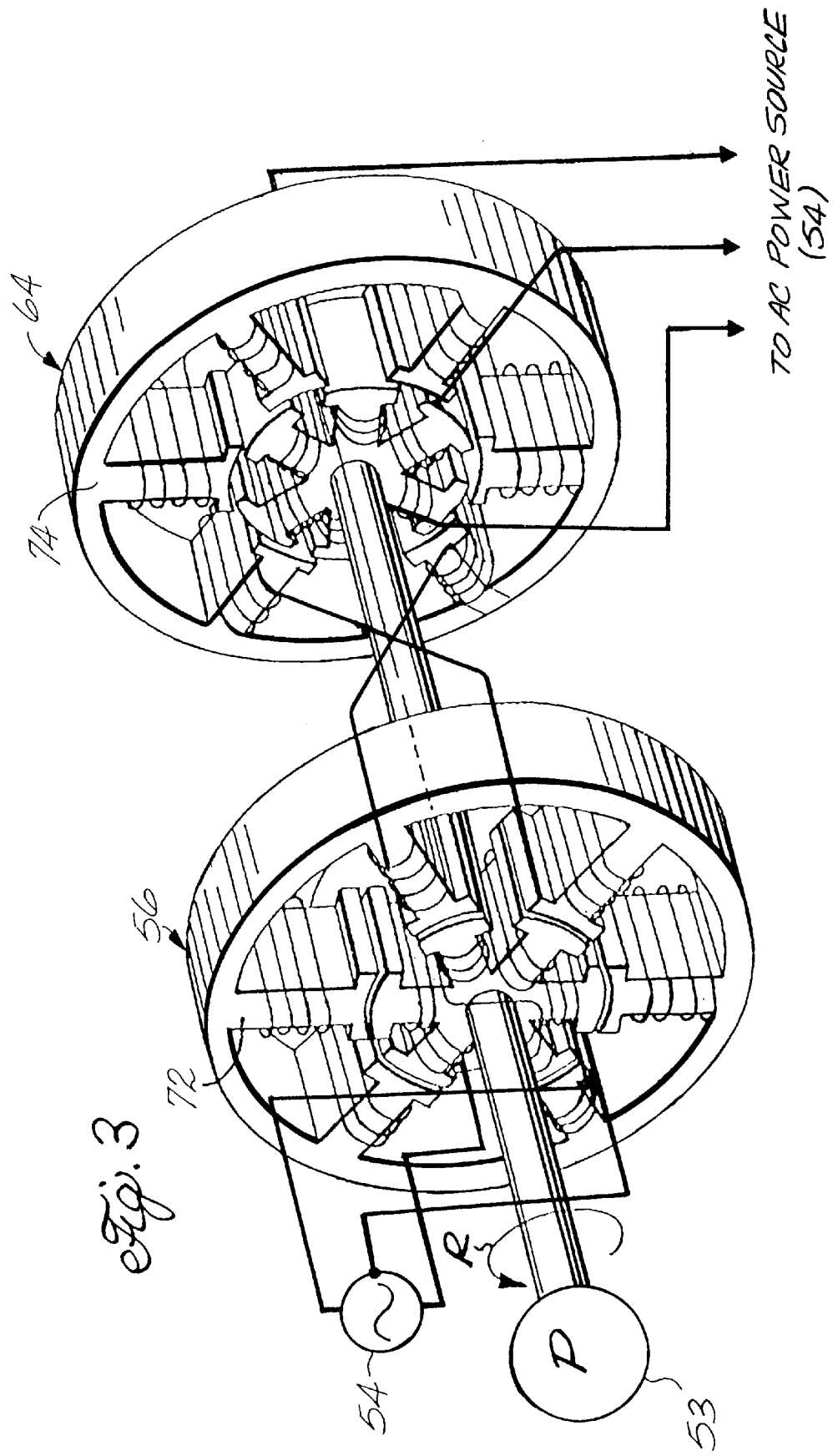
FIG. 3 is a simplified diagrammatic illustration of a three-phase rotor primary line synchronous generator in accordance with a preferred embodiment of the present invention.

In an alternative embodiment of the present invention, the rotors of the exciter and generator stages are connected to the AC power source, and the three-phase windings of the exciter and generator stators are connected for electrical cancellation. Turning to FIG. 3, an exciter rotor 52, disposed for rotary advancement by a local power source 53, has three electromagnetic pole pairs each with a primary winding connected across a different phase of the AC power source 54. The exciter stage 56 also includes an exciter stator 72 with three electromagnetic pole pairs wound with secondary windings.

Similarly, the generator stage 64 includes a generator stator 74 with three electromagnetic pole pairs wound with secondary windings. The secondary windings of the exciter stator 72 are inversely connected to the secondary windings of the generator stator 74 to effect electrical cancellation of the frequency induced by the angular rotation of the local power source. The generator rotor 75, connected for common rotation with the exciter rotor 52, is connected to the AC power source 54. For explanatory purposes only, the embodiments of the present invention will be described for a three-phase line synchronous generator configured as stator primary machine, i.e., stators connected to the AC power source. However, it will be understood by those skilled in the art that the present invention is not limited to stator primary machines, and that all described embodiments and test procedures are equally applicable to rotor primary machines, i.e., rotors connected to the AC power source.

As shown in FIG. 4 the line synchronous generator may be expanded to include redundant components. Specifically, a third redundant stage comprising a rotor 78 on the common shaft 80 and a stator 76 may be left unconnected. The terminals T001, T002 and T003 may then be connected in replacement for the terminals T1, T2 and T3 or T01, T02 and T03, in the event that the exciter or generator stage fails.

The operation of the generator is described with reference to FIG. 2. With stator primary machines, the exciter stator 28 is excited by the AC power source 30 which creates a revolving magnetic field at an angular rate equal to the frequency of the AC power source 30. The exciter rotor 32 is rotated by the local power source 33 within the rotating magnetic field developed by the exciter stator 28. The induced signal frequency at the output of the exciter rotor 32 is equal to the summation of the angular rate of the local power source 33 plus the frequency of the AC power source 30. As the generator rotor 34 is rotated within the generator stator 38, the inverse connection to the exciter rotor 32 causes the angular rate produced by the local power source 33 to be subtracted out. The result being an induced voltage at the output of the generating stator 38 equal in rate to the frequency of the AC power source. Thus, at any angular rate above synchronous speed for a multi-pole generator in accordance with an embodiment of the present invention, the voltage output will have the same frequency as the source it is connected with. Below synchronous speed, power will be consumed rather than generated.

While this theoretical solution resolves the effects of shaft speed variations on the output frequency of a three-phase line synchronous generator, optimal output performance can only be achieved by the proper phasing alignment between the exciter and generator stages 24, 26. This connection is achieved by initially ensuring that the primary windings of the exciter stage has the same phase sequence as the primary windings of the generator stage, and then inversely connecting the secondary windings of the exciter and generator stages.

As a result of exciter and generator stages being manufactured independently of one another, it is important to determine the proper connection between the primaries to ensure the each stage of the line synchronous generator has the same phase sequence. This determination can be made in a number of ways. For example, with a stator primary machine, a small three phase motor may be driven from the stator windings with power applied to the rotor windings. The proper phasing sequence of the stator windings will occur when the motor is driven in the same direction of rotation from both the exciter stator winding and the generator stator winding. Another way to obtain the proper phase sequence is with a phase rotation meter, or with two lamps and an AC capacitor connected in wye in accordance with known test techniques in the art.

Once the proper phase sequence is established, the stator windings are connected to the corresponding phases of the AC power source. The proper phase angle between the rotor windings is then established by the interconnection process. To obtain electrical cancellation of the frequency induced by the angular rate of the rotor shaft, the rotor windings must be connected such that the voltage induced by angular rotation in each exciter rotor winding has an equal but opposite polarity than the voltage induced in the generator rotor winding to which it is connected.

Figure 5A:
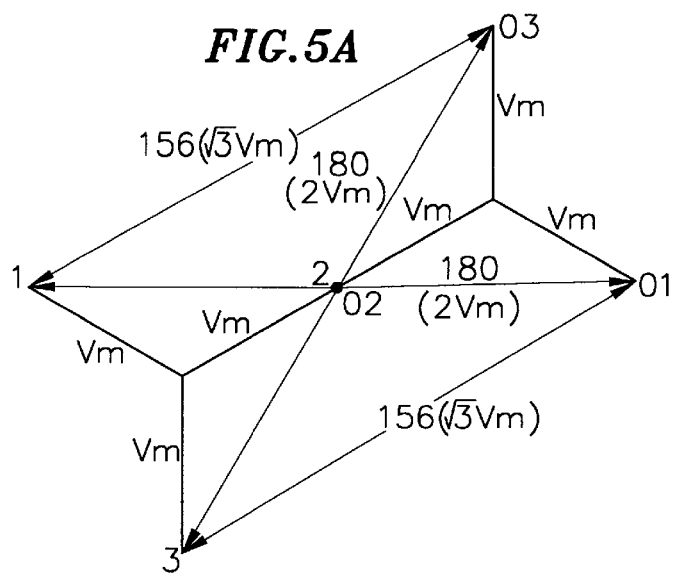
FIGS. 5A–5C are vector diagrams illustrating the proper phase relationships between the secondary windings of the line synchronous generator in accordance with a preferred embodiment of the present invention.
Figure 5B:
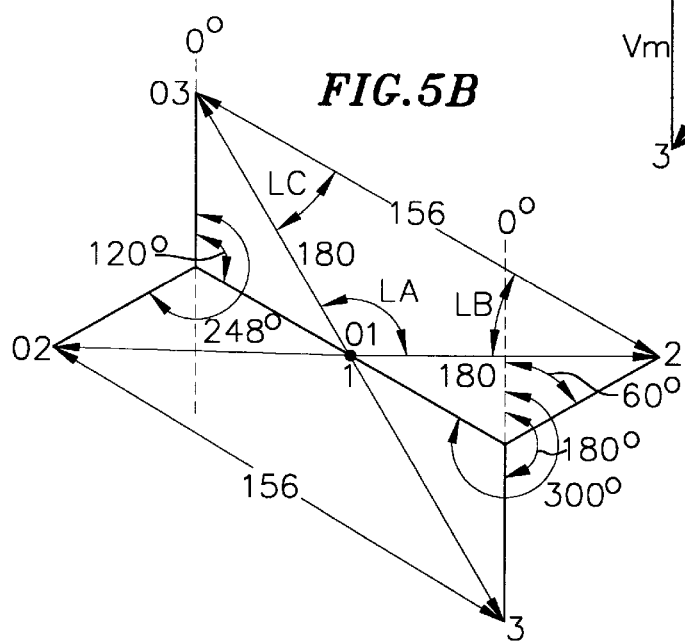
Figure 5C:
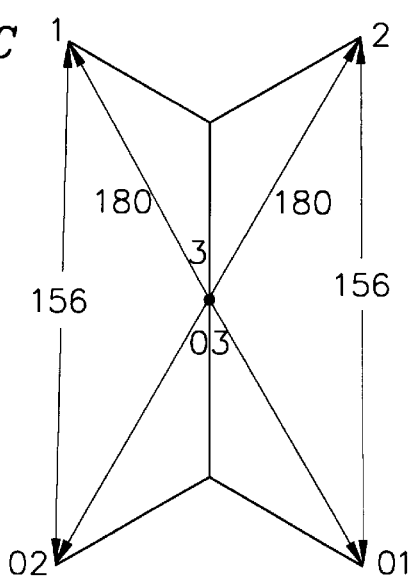

Vector diagrams provide a useful mechanism for illustrating how the interconnections between the second windings can be ascertained. As shown in FIGS. 5 and 6, only three possible interconnections between the rotor windings results in a 180° phase shift between the each secondary winding connection as shown in FIGS. 5A–5C, each exciter rotor winding is shifted 180 with respect to its corresponding generator rotor winding. For example, consider FIG. 5B. The following phase angles between the connected terminals are easily ascertained:

T03=0° and T3=180°; Δ180°
T01=120° and T1=300°; Δ180°; and
T02=240° and T2=60°; Δ180°.

The same phase relationships hold true for the secondary connections shown by the vector diagrams in FIGS. 5A and 5C.

Figure 6A:
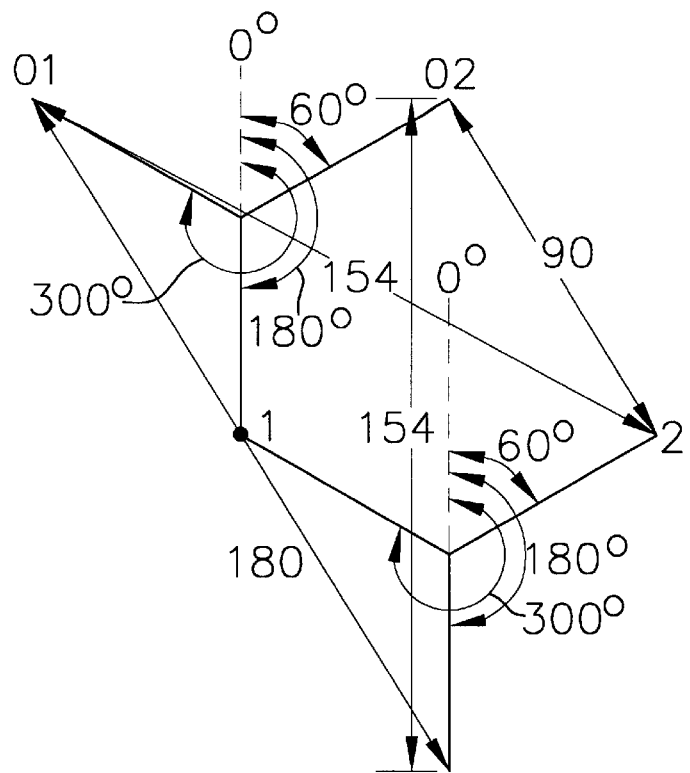
FIGS. 6A–6F are vector diagrams illustrating improper phase relationships between the secondary windings of the line synchronous generator in accordance with a preferred embodiment of the present invention.
Figure 6B:
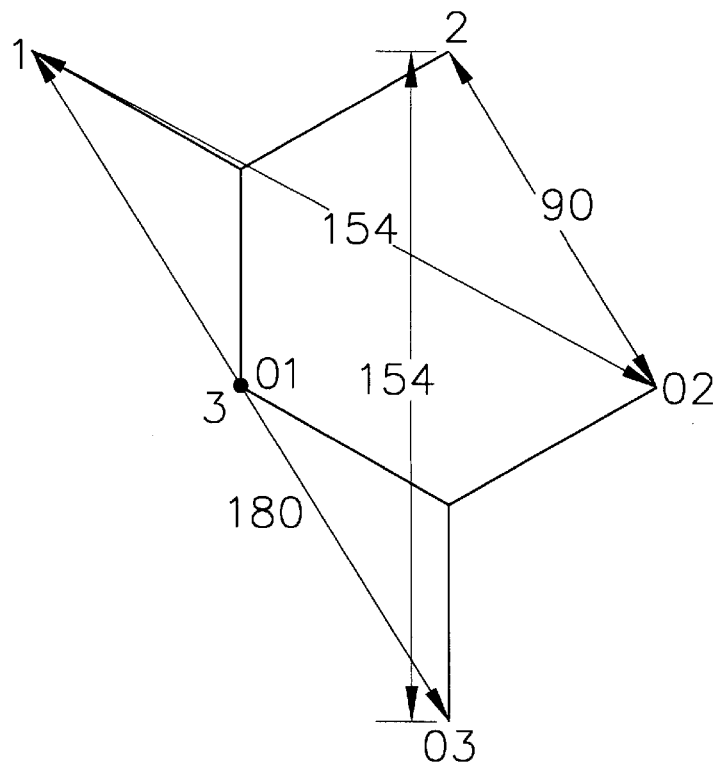
Figure 6C:
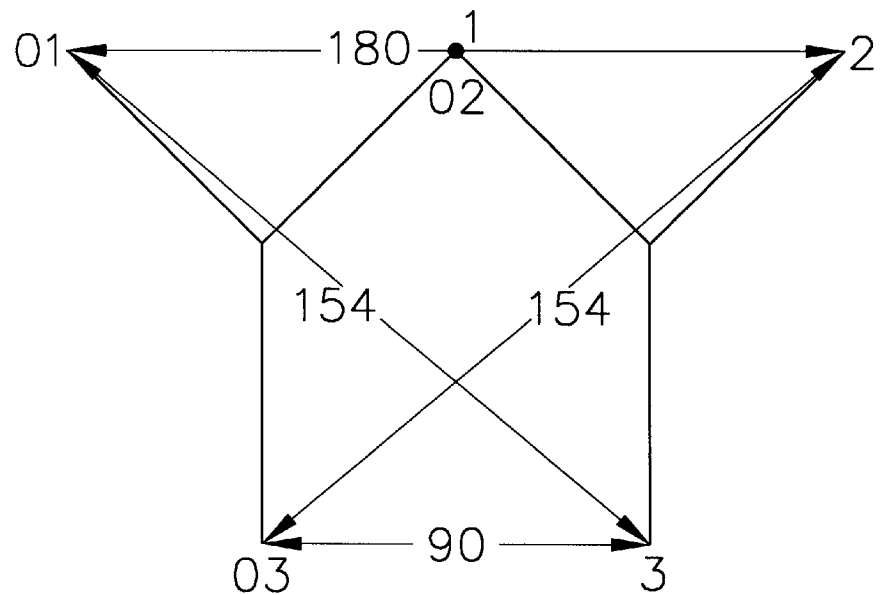
Figure 6D:
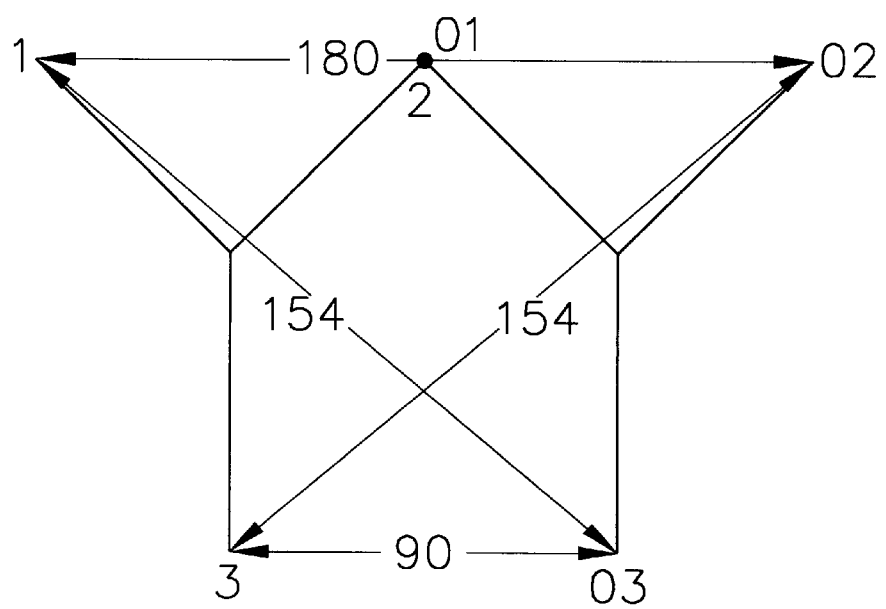
Figure 6E:
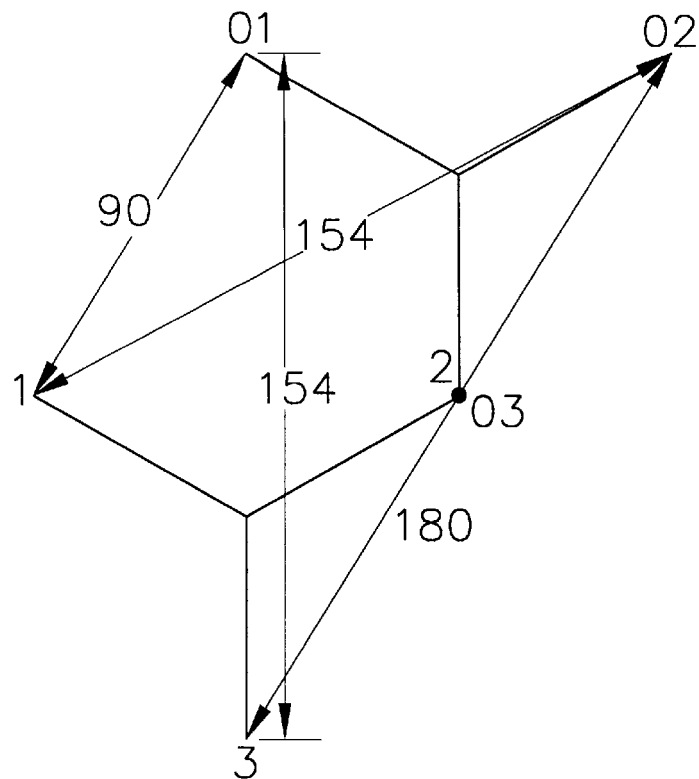
Figure 6F:
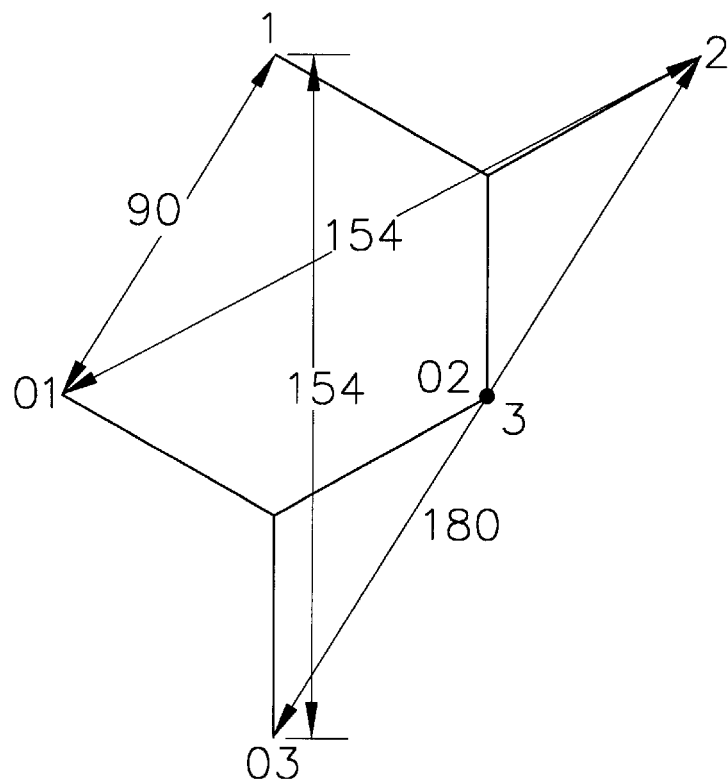

In contrast, there are six other possible interconnections which will not effect electrical cancellation of the frequency induced by the angular rotation of the rotors. These six incorrect connections are shown by the vector diagrams in FIGS. 6A–6F. As shown in each of these diagrams, the voltages in each pair of connections between the exciter rotor and the generator rotor not only has the same voltage, but has the same phase. Referring to FIG. 6A, by way of example, this relationship is easily shown:

T01=300° and T1=300°; Δ0°
T02=60° and T2=60°; Δ0°; and
T03=180° and T3=180°; Δ0°.

These vector diagrams are also useful for establishing test parameters for determining the proper interconnections between the rotor windings during the manufacturing process. Common to each of vector diagram of FIGS. 5A–5C, with one exciter rotor winding of the three-phase windings connected to one generator rotor winding, the voltages between the remaining open windings will consist of two pairs at two times the line voltage (2 Vm) and two pairs at √3 times the line voltage (√3 Vm) which is proven by the geometric relationship between the phases. For example, the voltages induced in the open windings in FIG. 5B are:

T2 to T02=2 Vm

T3 to T03=2 Vm

T2 to T03=√3 Vm

T3 to T02=√3 Vm

Since vectors have a designated length and direction in space, these results can be verified with an ordinary ruler.

The vector diagrams can be confirmed mathematically. Classic electrical theory holds that when a voltage is applied to a primary winding of an induction generator, a voltage will be induced into the open circuit secondary winding. A wye-connected three-phase winding has each phase displaced by 120°. The induced voltage at the open circuit secondary terminals will be balanced. For the phasing test, a jumper wire interconnects one terminal of each secondary winding. In FIG. 5B, this is terminal T1 and terminal T01. With a voltage applied to the primary, the remaining open circuit secondary voltages are measured. For FIG. 5A, this would be T2 to T02

T3 to T03

T2 to T03

T3 to T02

As can readily be seen from FIG. 5A, the secondary voltage between T2–T01 is the line voltage. Also, the voltage between T1–T02 is the line voltage. Therefore, the voltage between T2–T02 will be twice the line voltage. The same holds true for T3–T03.

The voltage across T2–T03 is the resultant of an oblique triangle defined by sides T1–T03, T01–T2, and T2–T03. When properly aligned, classic three-phase electrical theory identifies the angles as shown on FIG. 5B. The resultant voltage between T2–T03 will be:

$$V_{2-03} = (V_{2-03}) \frac{\sin \angle B}{\sin \angle A}$$

For proper alignment:

$$V_{2-03} = (V_{2-03}) \left( \frac{\sin 120°}{\sin 30°} \right)$$

$$= (V_{2-03}) \left( \frac{0.866}{0.5} \right)$$

$$= (V_{2-03}) (1.73)$$

The same holds true for the voltage between T3–T02. Therefore, with proper alignment, the voltage will be one pair of terminals at two times line voltage and one pair of terminals at 3 times the line voltage.

With the knowledge gleaned from these vector diagrams, a methodology of interconnecting the rotor windings can be ascertained which significantly reduces the manufacturing cost while increasing product yield. Specifically, the method for determining the proper interconnections in a stator primary machine requires the connection of a pair of rotor windings and then finding two remaining pairs of substantially identical voltages between the rotor windings.

Figure 7A:
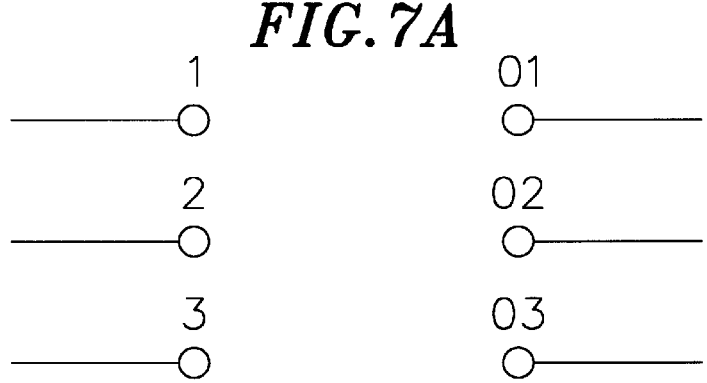
FIG. 7A is a diagrammatic illustration showing the secondary windings of the line synchronous generator in accordance with a preferred embodiment of the present invention before test.

Turning to FIG. 7A, the secondary windings are shown ready for test. The exciter and generator stators are connected to an AC power source. The line voltages induced should be equal if the two sets of rotor windings are alike: turns, pitch, wire size, connection, etc. In this example, the interphase voltage is 90 volts. The connection could be wye (star) as shown, or delta, or one of each. In order to obtain test readings, a terminal from each rotor winding is joined by a connecting jumper.

Either the primary or secondary could be the rotor or stator, but they must be the same part. Thus, if one half of the synchronous generator is configured as a rotor primary machine, then the other half of the synchronous generator must also be configured as a rotor primary machine.

As defined by the vector diagrams of FIGS. 5 and 6, two pairs of substantially identical voltages must be found. With a line voltage of 90 volts, the following values must be obtained during test:

2(90)=180 volts for one voltage pair; and

√3(90)=156 volts for the other voltage pair.

To perform the test, a jumper wire is placed across a terminal for each rotor winding. In this example, a jumper wire is first placed across T1 and T01 and the following voltages are obtained by test:

T2–T02=156 volts

T2–T03=90 volts

T3–T02=180 volts

T3–T03=156 volts.

These measured voltages are consistent with FIGS. 6A–6F showing the improper interconnection of rotor windings.

The jumper wire is then removed and placed across another terminal pair. In this example, the jumper wire is next placed across T2 and T01, and the following voltage are obtained by test:

T1–T02=156 volts

T1–T03=180 volts

T3–T02=180 volts

T3–T03=156 volts.

Figure 7B:
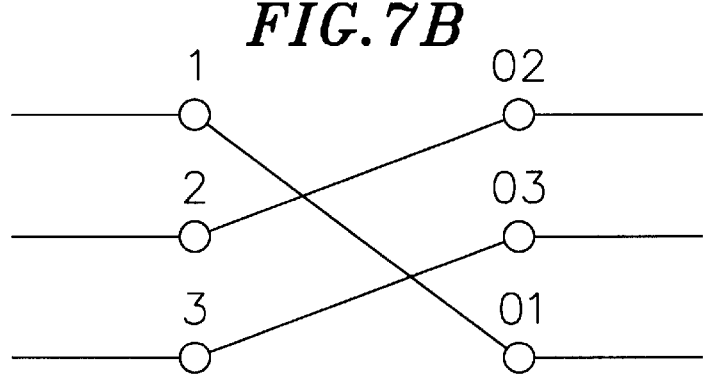
FIG. 7B is a diagrammatic illustration showing the secondary windings of the line synchronous generator in accordance with a preferred embodiment of the present invention when properly connected with renumbered terminals.

This result is consistent with FIGS. 5A–5C and confirms the proper interconnection of the rotor windings. From the vector diagrams 5A–5C it can be seen that the rotor windings having a voltage of 2 Vm, or 180 volts should be connected together. The proper interconnections of the rotor windings are shown in FIG. 7B with T1 connected to T03 and T3 connected to T02. Preferrably, the terminals should be renumbered.

Once the proper phase angle between the rotor windings is established, electrical compensation may then be inserted between each pair of the three-phase windings. Specifically, resistors and capacitors can be inserted between the respective windings to expand the dynamic operating range of the device without the necessity of continual phase angle adjustments between the exciter and generator stages. Alternatively, electrical compensation may be inserted in the primary windings of the stators.

Figure 8:
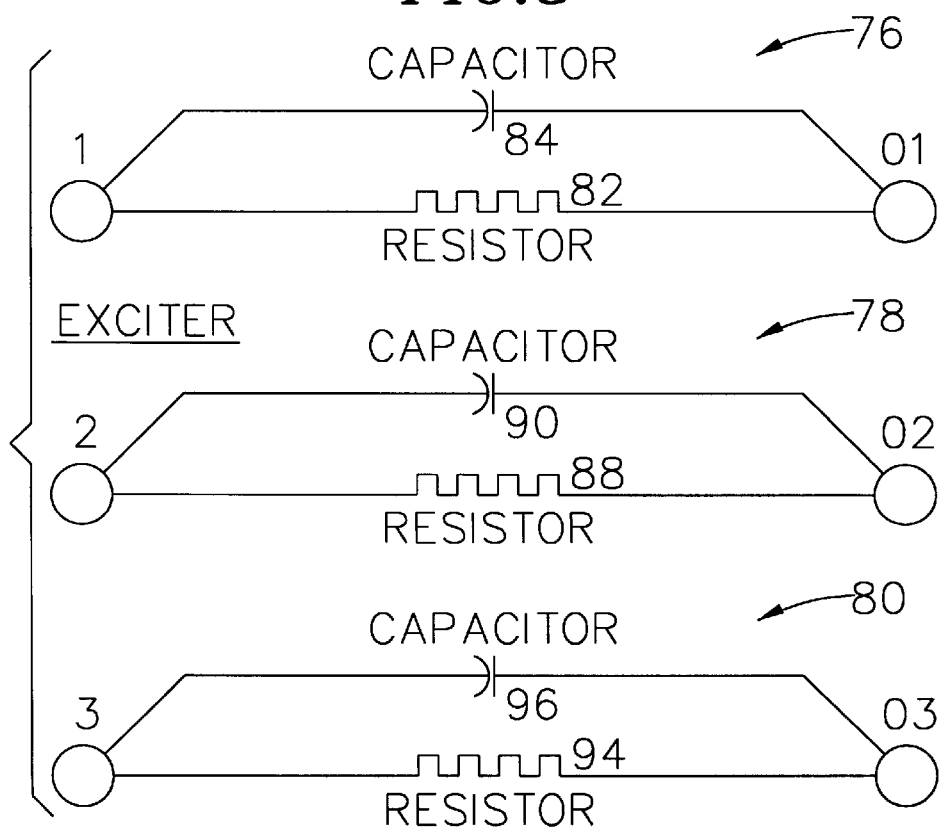
FIG. 8 is a diagrammatic illustration showing compensation circuitry connected between the secondary windings in accordance with a preferred embodiment of the present invention.

Turning to FIG. 8, the effect of compensation resistance inserted between the rotor windings results in an expanded operating range allowing higher operating speed. In this example, compensation networks 76, 78 and 80 effect the winding interconnection described above. Network 76 includes a resistor 82, in parallel with a capacitor 84, network 78 comprises a resistor 88 in parallel connection with a capacitor 90, and network 80 comprises a resistor 94, in parallel connection with a capacitor 96. It has been found that by increasing the resistance of resistors 82, 88, and 94 from approximately 0 ohms to about 5.8 ohms, the dynamic range expressed in ratio of both the power factor and efficiency are substantially increased.

Figure 9:
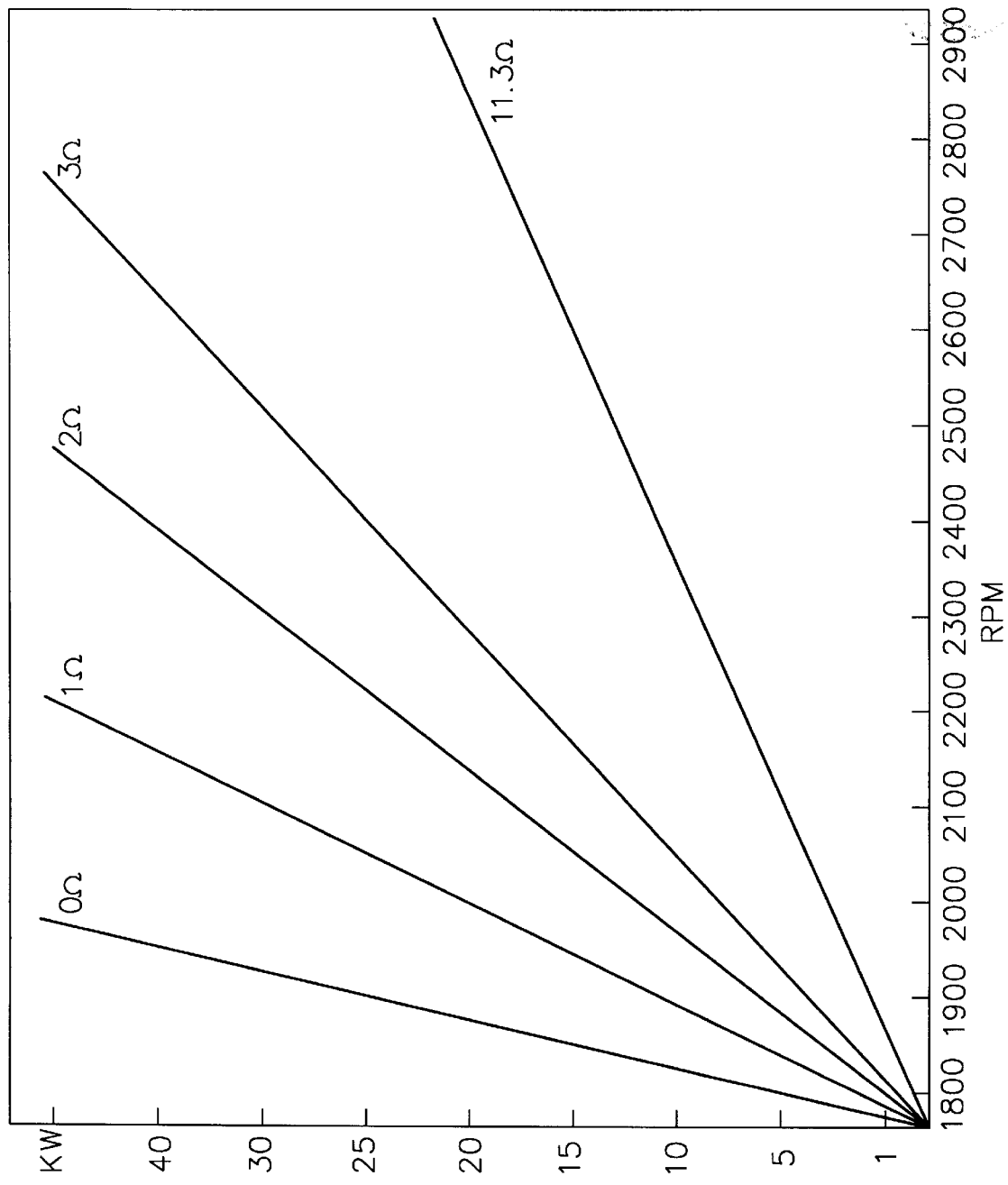
FIG. 9 is a graph illustrating the output power for various compensation circuits as a function of angular rotation of the rotors in accordance with a preferred embodiment of the present invention.

FIG. 9 shows the expanded range of the device using utilizing resistors to achieve the desired results for tailored applications. The output curve is shown for a 15 kW, 4 pole, 60 Hz three-phase line synchronizing generator.

Another important parameter for optimizing performance of the three-phase line synchronous generator is the phase angle between the generator and exciter stages. In a preferred embodiment of the present invention, the angular position of the exciter stator, exciter generator, generator rotor or generator stator can be advanced or retarded to optimize performance. Optimal loading is a function of the exciter phase angle and rotor rpm. As the RPM increases substantially above "synchronous speed", the phase angle range necessary to meet maximum generator load narrows significantly. Thus, through manipulation of the phase angle of the exciter stage relative to the generator stage, complete control over loading is achieved. A responsive and accurate device must be employed to adequately provide phase angle optimization when variable speed prime movers are used.

Figure 10:
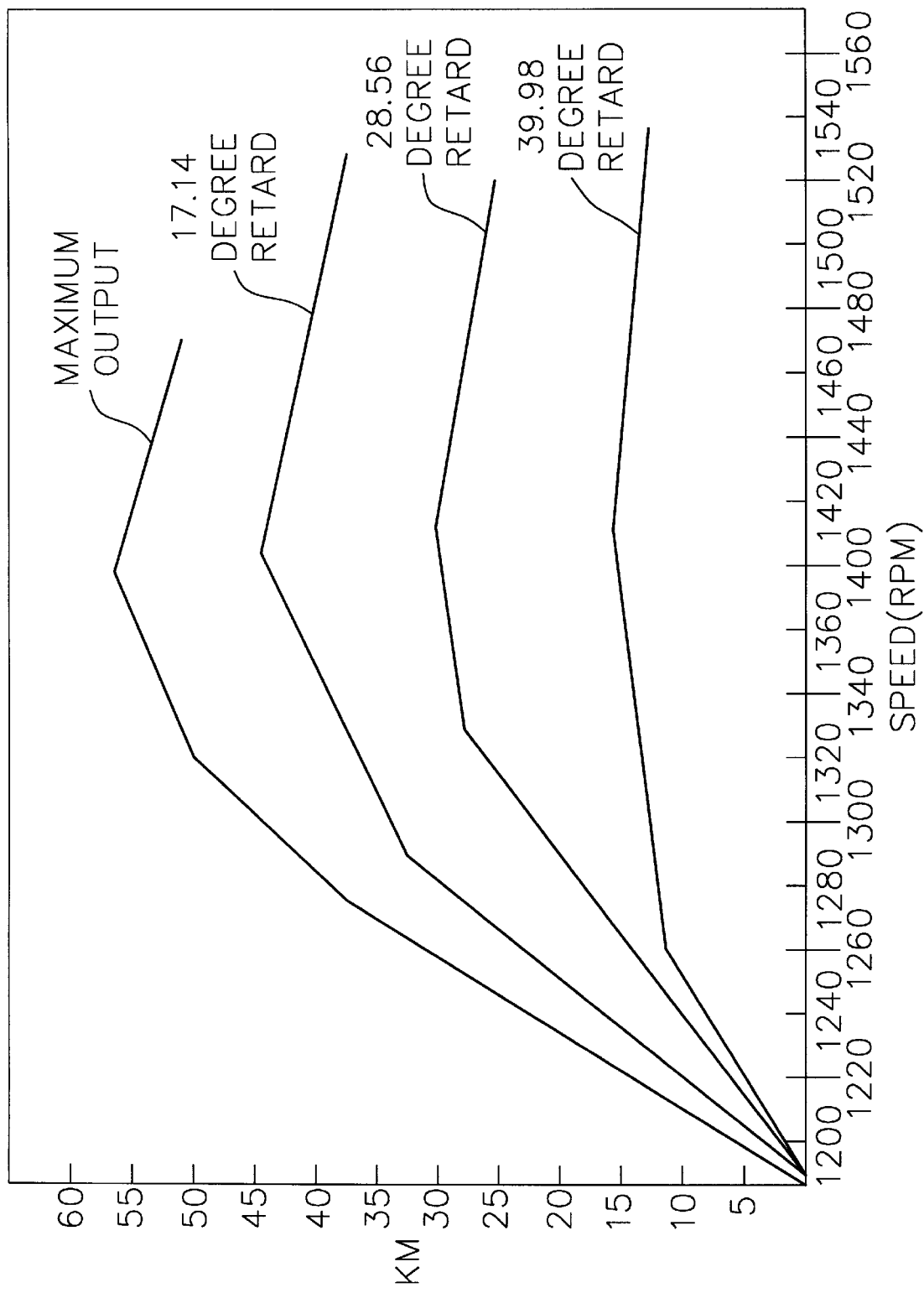
FIG. 10 is a graph illustrating the output power for phase angles between the exciter and generator stage as a function of angular rotation of the rotors in accordance with a preferred embodiment of the present invention.

FIG. 10 illustrates the output power of a 6 pole, 25 kW, 480 volt, 60 Hz stator primary machine coupled to a 75 horsepower DC variable speed motor at different phase angles. The power output is shown at four different phase angles between the exciter and generator magnetic field.

In a preferred embodiment, the generator stator field is tapped and compared with the AC source frequency by a control mechanism to provide a phase error signal to a servo motor. This servo motor positions the exciter stator to optimize generator loading, a function of the phase difference that results from changes in shaft speed. The accuracy and response of the servo motor and its control mechanism are critical to optimize generator loading. Because servo motor control technology is sufficiently advanced, accurate exciter induction compensation can be provided in virtually all electrical generation applications.

Figure 11:
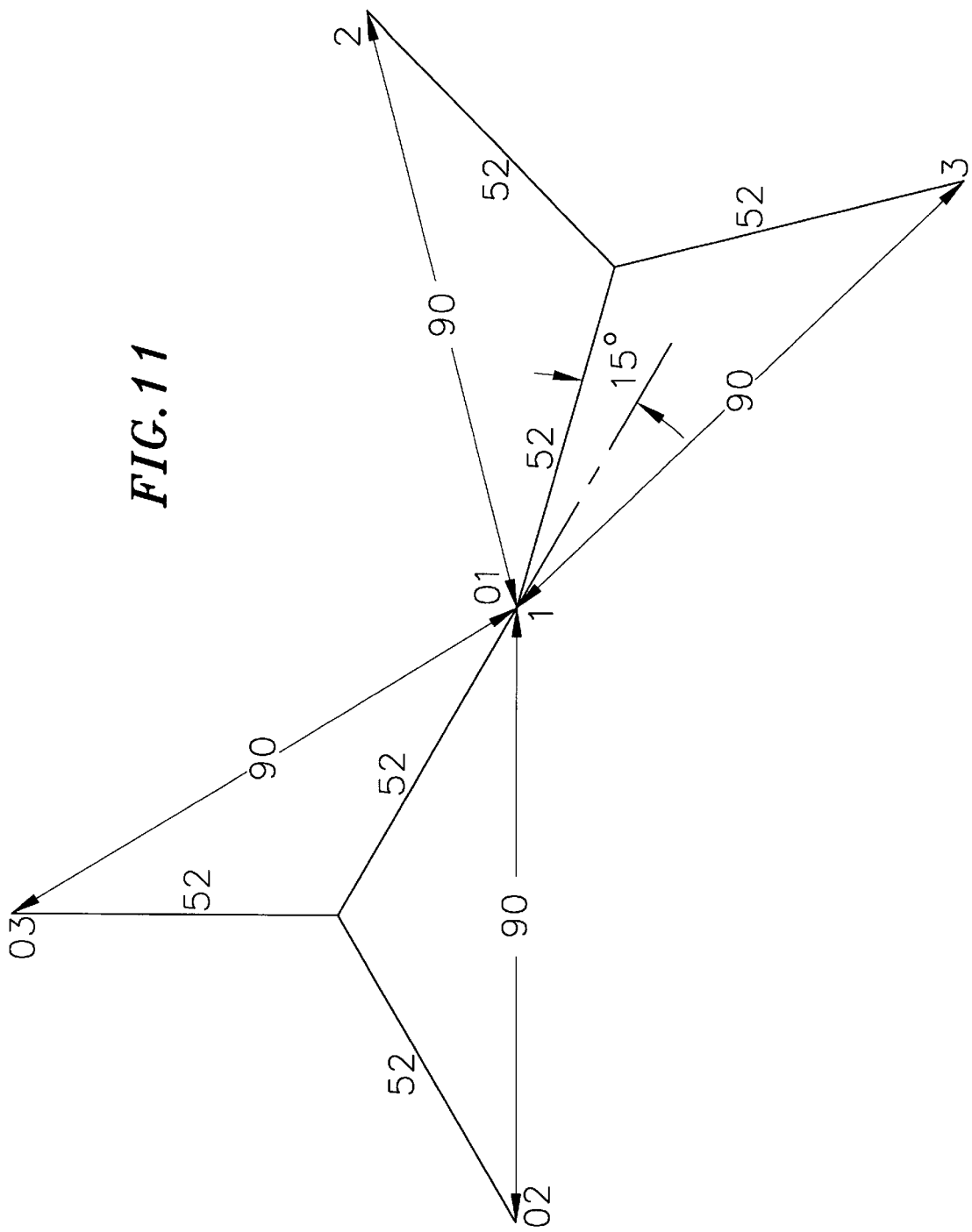
FIG. 11 is a vector diagram illustrating the proper phase relationships between the secondary windings of the line synchronous generator with a 15° phase angle error in accordance with a preferred embodiment of the present invention.

Alternatively, the phase angle may be set during the interconnection process of the rotor windings. Turning to FIG. 11, a vector diagram is shown representing the phase relationships of the rotor windings with proper interconnection to effect electrical cancellation but with a 15° phase angle misalignment between the exciter and generator stages. The test represented in FIG. 10 is performed with T1 connected to T01. The following test results are obtained:

T2 to T02=178 volts
T2 to T03=143 volts
T3 to T02=166 volts
T3 to T03=178 volts

The voltage between terminals T2–T02 and T3–T03 are each 178 volts, which is close enough to 180 volts to satisfy one of the required pairs. However, the voltages between the remaining terminals are not close enough to the 156 volts to satisfy the second required pair. However, if the voltages are averaged, the result is 155 volts which is close to the desired voltage. This indicates improper phase angle between the exciter stage and the generator stage. In this case, either the exciter stator, the exciter rotor, the generator stator or the generator rotor can be physically rotated on its axis until the voltages between T2 and T03 and the voltages between T3 and T02 each read 155 volts. In this case, from the vector diagram of FIG. 8, it can be seen that a 15° electrical phase shift will result in optimal performance.

Alternatively, phase angle correction can be performed by altering the windings of either the exciter rotor, exciter stator, generator rotor or the generator stator. In other words, the optimum phase angle can be achieved without physically shifting the rotors or stators, but winding them offset. If slots on the generator portion are numbered 1 to 36, for example, we start the generator group in slot 1, and the exciter's group is started in slot 2 or 3, to get the phase angle as desired.

The physical angular displacement is determined by the number of poles. Specifically, the angular displacement is:

$$X = \frac{360°}{\text{Phases} \times \text{Poles}}$$

For a four (4) pole three-phase system this angle is:

$$X = \frac{360°}{(3)(4)} = 20°$$

Therefore, one an angular displacement of 20° is required. This may be accomplished by displacing the winding of two fixed cores only if the slot count allows the requisite angle to be met. For example, a 36 slot core with a two slot displacement would result in 20° and is acceptable for four (4) pole three-phase system. But a 48 slot core does not result in any combination of 20°, and therefore, phase angle alignment could not be obtained by core displacement.

The described embodiments provide an important solution that allows the rotational speed to vary substantially over traditional machinery limits while remaining self-synchronizing. The active controls are simplified to those necessary for safety purposes. The machinery speed maximum limits may be enhanced with simple active control of passive devices. This shows the versatility of the inventor, an inherently acceptable speed range which may be extended by addition of simple passive devices. Thus, any local power source which allows for a minimum speed and exceeds the parasitic losses of the device may be effectively used to supply the utility grid. Such adaptation of local alternative power sources has a major potential for resolving the present energy shortage with minimum adverse ecological consequences.

It is apparent from the foregoing that the present invention satisfies an immediate need for a three-phase line synchronous generator with proper phasing having a constant frequency and voltage output at variable shaft speeds. This three-phase line synchronous generator may be embodied in other specific forms and can be used with a variety of fuel sources, such as windmills, wind turbines, water wheels, water turbines, internal combustion engines, solar powered engines, steam turbine, without departing from the spirit or essential attributes of the present invention. It is therefore desired that the described embodiments be considered in all respects as illustrative and not restrictive, reference being made to the appended claims rather than the foregoing description to indicate the scope of the invention.

What is claimed is:

1. A method for determining phase alignment of a three-phase line synchronous generator, said line synchronous generator including an exciter stage having an exciter stator and an exciter rotor, one of said exciter stator and exciter rotor having a primary winding and the other one of said exciter stator and exciter rotor having first, second and third secondary phase windings, and a generator stage having a generator rotor and a generator stator, one of said generator stator and generator rotor having a primary winding and the other one of said generator stator and generator rotor having first, second and third secondary phase windings, the method comprising:

connecting the primary windings of the exciter and generator stages to a three-phase AC power source, said AC power source having a line voltage equal to Vm;

connecting the first secondary phase winding of the exciter stage to the first secondary phase winding of the generator stage;

measuring a voltage of approximately 2 Vm between the second secondary phase winding of the exciter stage and the second secondary phase winding of the generator stage;

measuring a voltage of approximately 2 Vm between the third secondary phase winding of the exciter stage and the third secondary phase winding of the generator stage;

connecting the second secondary phase winding of the exciter stage to the second secondary phase winding of the generator stage; and connecting the third secondary phase winding of the exciter stage to the third secondary phase winding of the generator stage.

2. The method of claim 1 further comprising measuring a voltage of approximately of $\sqrt{3}$ Vm between the second secondary phase winding of the exciter stage and the third secondary phase winding of the generator stage, and measuring a voltage of approximately $\sqrt{3}$ Vm between the third secondary phase winding of the exciter stage and the second secondary phase winding of the generator stage.

3. The method of claim 1 further comprising rotating one of said exciter stator, exciter rotor, generator stator and generator rotor on its axis before measuring the voltage between the second secondary phase winding of the exciter stage and the second secondary phase winding of the generator stage and measuring the voltage between the third secondary phase winding of the exciter stage and the third secondary phase winding of the generator stage.

4. The method of claim 1 further comprising measuring the same phase sequence in the primary windings of the exciter and generator stages.

5. A method for determining phase alignment of a three-phase line synchronous generator, said line synchronous generator including an exciter stage having an exciter stator and an exciter rotor, one of said exciter stator and exciter rotor having a primary winding and the other one of said exciter stator and exciter rotor having a secondary winding with three phases, and a generator stage having a generator rotor and a generator stator, one of said generator stator and generator rotor having a primary winding and the other one of said generator stator and generator rotor having a secondary winding with three phases, the method comprising:

connecting the primary windings of the exciter and generator stages to a three-phase AC power source, said AC power source having a line voltage equal to Vm;

connecting a first one of the three phases of the secondary winding of the exciter stage to a first one of the three phases of the secondary winding of the generator stage;

finding a second one of the three phases of the secondary winding of the exciter stage and a second one of the three phases of the secondary winding of the generator stage with a voltage of approximately 2 Vm therebetween;

finding a third one of the three phases of the secondary winding of the exciter stage and a third one of the three phases of the secondary winding of the generator stage with a voltage of approximately 2 Vm therebetween;

connecting the second one of the three phases of the secondary winding of the exciter stage to the second one of the three phases of the secondary winding of the generator stage; and connecting the third one of the three phases of the secondary winding of the exciter stage to the third one of the three phases of the secondary winding of the generator stage.

6. The method of claim 5 further comprising rotating one of said exciter stator, exciter rotor, generator stator and generator rotor on its axis.

7. The method of claim 5 further comprising measuring the same phase sequence in the primary windings of the exciter and generator stages.

8. A method for determining phase alignment of a two stage three-phase line synchronous generator, comprising:

connecting primary windings of each of the two stages to a three-phase AC power source, said AC power source having a line voltage equal to Vm;

connecting a first one of three phases of a secondary winding of one of the two stages to a first one of three phases of a secondary winding of the other one of the two stages;

finding a second one of the three phases of the secondary winding of said one of the two stages and a second one of the three phases of the secondary winding of said other one of the two stages with a voltage of approximately 2 Vm therebetween;

finding a third one of the three phases of the secondary winding of said one of the two stages and a third one of the three phases of the secondary winding of said other one of the two stages with a voltage of approximately 2 Vm therebetween;

connecting the second one of the three phases of the secondary winding of said one of the two stages to the second one of the three phases of the secondary winding of said other one of the two stages; and connecting the third one of the three phases of the secondary winding of said one of the two stages to the third one of the three phases of the secondary winding of said other one of the two stages.

9. The method of claim 8 further comprising rotating one of a stator of said one of the two stages, a rotor of said one of the two stages, a stator of said other one of the two stages and a generator of said other one of the two stages on its axis.

10. The method of claim 8 further comprising measuring the same phase sequence in the primary windings of the two stages.

* * * * *